(12) United States Patent
Qi et al.

(10) Patent No.: US 11,070,052 B2
(45) Date of Patent: Jul. 20, 2021

(54) CIRCUIT PROTECTION SYSTEM

(71) Applicant: ABB S.p.A., Milan (IT)

(72) Inventors: Li Qi, Cary, NC (US); Yu Du, Raleigh, NC (US); Tao Cui, Princeton, NJ (US)

(73) Assignee: ABB S.p.A., Milan (IT)

( * ) Notice: Subject to any disclaimer, the term of this patent is extended or adjusted under 35 U.S.C. 154(b) by 684 days.

(21) Appl. No.: 15/387,135

(22) Filed: Dec. 21, 2016

(65) Prior Publication Data

US 2018/0175605 A1 Jun. 21, 2018

(51) Int. Cl.
*H02H 7/26* (2006.01)
*H02H 3/06* (2006.01)
*H02H 1/00* (2006.01)
*H02H 3/00* (2006.01)

(52) U.S. Cl.
CPC .......... *H02H 7/263* (2013.01); *H02H 1/0061* (2013.01); *H02H 3/00* (2013.01); *H02H 3/066* (2013.01)

(58) Field of Classification Search
CPC ... H02H 7/261; H02H 7/26–30; H02H 1/0061
USPC ...................................... 361/62–69
See application file for complete search history.

(56) References Cited

U.S. PATENT DOCUMENTS

| | | | | |
|---|---|---|---|---|
| 5,513,061 A * | 4/1996 | Gelbien | ................. | H02H 7/262 361/63 |
| 6,952,335 B2 | 10/2005 | Huang et al. | | |
| 6,999,291 B2 * | 2/2006 | Andarawis | ............. | H02H 7/263 361/64 |
| 7,405,910 B2 | 7/2008 | Maitra et al. | | |
| 7,511,933 B2 * | 3/2009 | Hartman | ................. | H02H 9/042 361/111 |
| 8,675,325 B2 | 3/2014 | Beierschmitt et al. | | |
| 8,792,217 B2 * | 7/2014 | Shah | ...................... | H02H 7/261 361/20 |
| 8,861,162 B2 * | 10/2014 | Fuller | .................... | H01H 9/548 361/42 |
| 9,225,162 B2 | 12/2015 | Zhang et al. | | |
| 2003/0151874 A1 * | 8/2003 | Shipp | ..................... | H02H 9/042 361/126 |

(Continued)

FOREIGN PATENT DOCUMENTS

DE 202012104080 U1 12/2012

OTHER PUBLICATIONS

ATOM POWER, http://atompower.com/#products, captured Sep. 7, 2016, 10 pages.

*Primary Examiner* — Jared Fureman
*Assistant Examiner* — Christopher J Clark
(74) *Attorney, Agent, or Firm* — Taft Stettinius & Hollister LLP

(57) ABSTRACT

A circuit protection system includes a plurality of circuit protection devices and a central controller. Each circuit protection device includes a protection switch for connecting or disconnecting a corresponding protected circuit, and a sensing module for sensing electrical parameter data. The central controller is in communication with each of the circuit protection devices, and is constructed to receive the electrical parameter data; determine whether a fault condition has occurred based on the electrical parameter data; and send a signal to open the protection switch for each protected circuit experiencing a fault condition.

19 Claims, 3 Drawing Sheets

(56) References Cited

U.S. PATENT DOCUMENTS

| | | |
|---|---|---|
| 2004/0130837 A1* | 7/2004 | Papallo .................... G06F 1/12 |
| | | 361/60 |
| 2012/0050933 A1 | 3/2012 | Xu et al. |
| 2013/0187482 A1* | 7/2013 | Bauer .................... H03K 17/18 |
| | | 307/117 |
| 2014/0029152 A1 | 1/2014 | Mazzola et al. |
| 2015/0057822 A1 | 2/2015 | Baldridge |

* cited by examiner

CIRCUIT PROTECTION SYSTEM

TECHNICAL FIELD

The present application generally relates to switch systems and more particularly, but not exclusively, to circuit protection systems.

BACKGROUND

Electrical systems of various types, e.g., circuit protection systems, remain an area of interest. Some existing systems have various shortcomings, drawbacks and disadvantages relative to certain applications. For example, in some circuit protection systems, improvements may be made in terms of thermal management, operability and current capacity. Accordingly, there remains a need for further contributions in this area of technology.

SUMMARY

One embodiment of the present invention is a unique circuit protection system. Another embodiment is another unique circuit protection system. Other embodiments include apparatuses, systems, devices, hardware, methods, and combinations for circuit protection systems. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
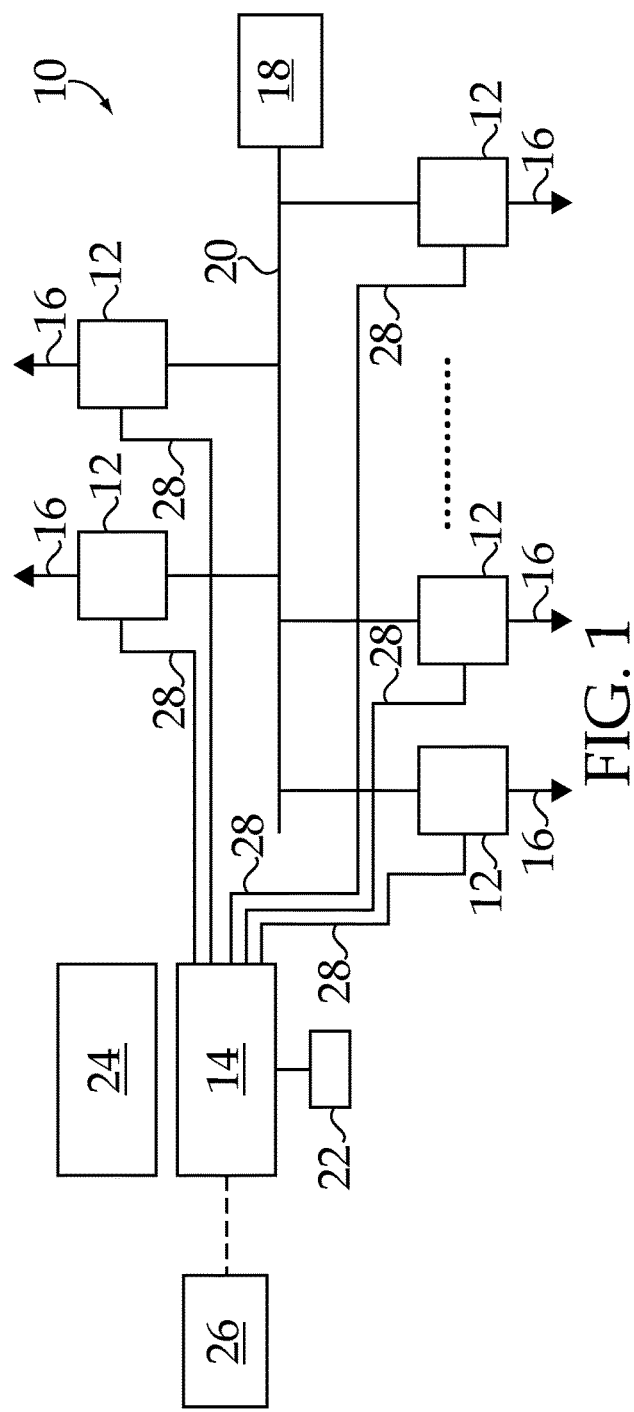
FIG. 1 schematically illustrates some aspects of a non-limiting example of a circuit protection system in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a circuit protection system 10 in accordance with an embodiment of the present invention are schematically illustrated. Circuit protection system 10 includes a plurality of circuit protection devices 12 communicatively coupled to a central controller 14 and electrically disposed in a plurality of protected circuits 16 coupled to a power source 18, e.g., to a load center 20. Some embodiments include an input device 22 coupled to or included as part of central controller 14, e.g., a keyboard, keypad, touch screen or one or more switches or other input devices. Some embodiments may also include a backup central controller 24, e.g., coupled to central controller 14 and/or circuit protection devices 12. In some embodiments, circuit protection system 10 may also include a system controller 26 coupled to central controller 14. The number of circuit protection devices 12 may vary with the needs of the application. In one form, circuit protection system 10 is a circuit breaker system. In other embodiments, circuit protection system 10 may take other forms.

Each circuit protection device 12 is coupled to power source 18, e.g., load center 20. Power source 18 supplies AC power, and may be, for example, a utility grid, a generator, an inverted DC power source, or any AC power source. In some embodiments, power source 18 may be a DC power source. Each circuit protection device 12 is communicatively coupled to central controller 14 via an analog communication link, such as one or more wired connections. In one form, the analog communication links are bidirectional, e.g., operative to transmit signals from each circuit protection device 12 to central controller 14 and to transmit signals from central controller 14 to each circuit protection device 12. In one form, analog communication links 28 are multi-channel, e.g., effective to transmit more than one analog signal between central controller 14 and circuit protection devices 12 at the same time.

Circuit protection devices 12 are operative to connect and disconnect protected circuits 16 from power source 18 in response to a signal from central controller 14. Circuit protection devices 12 are constructed to protect protected circuits 16 from fault conditions, such as over voltage conditions or over current conditions, by disconnecting any protected circuit 16 that experiences a fault condition in response to one or more signals sent by central controller 14. Circuit protection devices 12 may be collocated, e.g., disposed together within a circuit breaker box with central controller 14, or may be disposed at locations remote from each other and/or from central controller 14, e.g., disposed at or as part of particular electrical devices, machines, lighting centers, sub circuits, remote circuit breaker cabinets, etc.

Figure 2:
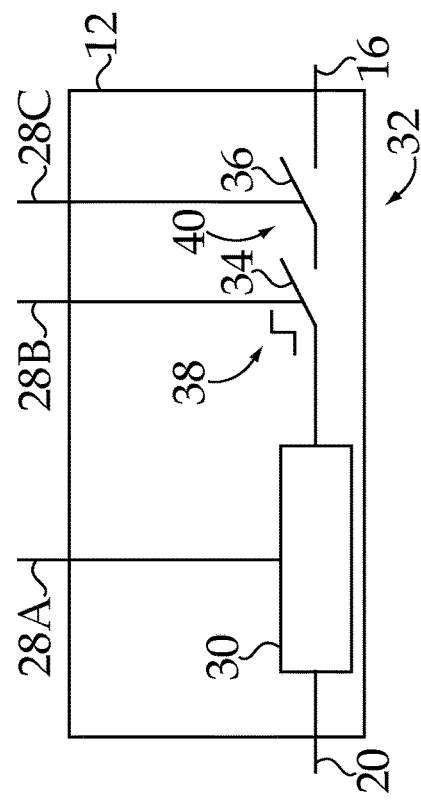
FIG. 2 schematically illustrates some aspects of a non-limiting example of a circuit protection device for a circuit protection system in accordance with an embodiment of the present invention.

Referring to FIG. 2, each circuit protection device 12 includes a sensing module 30 and a protection switch 32. Protection switch 32 is operative to connect and disconnect the corresponding protected circuit 16 from power source 18 at the direction of central controller 14. In one form, protection switch 32 includes a solid state switch 34 coupled between load center 20 and circuit 16. Solid state switch 34 may be or may include one or more semiconductor switching devices, for example and without limitation, one or more silicon, silicon carbide and/or gallium nitride semiconductor switching devices, e.g., one or more IGBT, FET, MOSFET, JFET and/or (GaN) HEMT devices. Solid state switch 34 is operative to turn on or off, e.g., electrically close or open to respectively allow or prevent the flow of power through protected circuit 16. In some embodiments, protection switch 32 also includes a galvanic isolator 36 operative to provide galvanic isolation to solid state switch 34 and galvanically isolate protected circuit 16 from power source 18. Galvanic isolator 36 is coupled in series to solid state switch 34 between load center 20 and circuit 16. In one form, galvanic isolator 36 is a mechanical switch. In other embodiments, galvanic isolator 36 may take other forms.

In the example of FIG. 2, analog communication link 28 includes 3 channels, identified as channels 28A, 28B and 28C. Sensing module 30 is communicatively coupled to central controller 14 via channel 28A. Sensing module 30 is operative to sense electrical parameter data pertaining to the protected circuit 16 associated with the particular circuit protection device 12, and to transmit the electrical parameter data to central controller 14 via communication channel 28A. Electrical parameter data may include, for example and without limitation, voltage and/or current in protected circuit 16, and/or rates of change of voltage and/or current in protected circuit 16, depending upon the embodiment. In some embodiments, the electrical parameter data may also or alternatively include data pertaining to other electrical parameters. In embodiments providing more than one data type or quantity, channel 28A may represent or be subdivided into a number of sub-channels, one for each data type or quantity.

Solid state switch 34 has a gate 38. Gate 38 is communicatively coupled to central controller 14 via channel 28B. Channel 28B is operative to transmit a gate drive signal from central controller 14 to gate 38 for opening and closing solid state switch 34. Galvanic isolator 36 includes a control terminal 40. Control terminal 40 is communicatively coupled to central controller 14 via channel 28C. Channel 28C is operative to transmit a control signal from central controller 14 to control terminal 40 for opening and closing galvanic isolator 36. In some embodiments, the same signal sent from controller 14 via the analog communications link may be used to turn both solid state switch 34 and galvanic isolator 36 on or off, in which case analog communication link 28 may only include 2 channels. In other embodiments, analog communication link 28 may include any number of channels.

Figure 3:
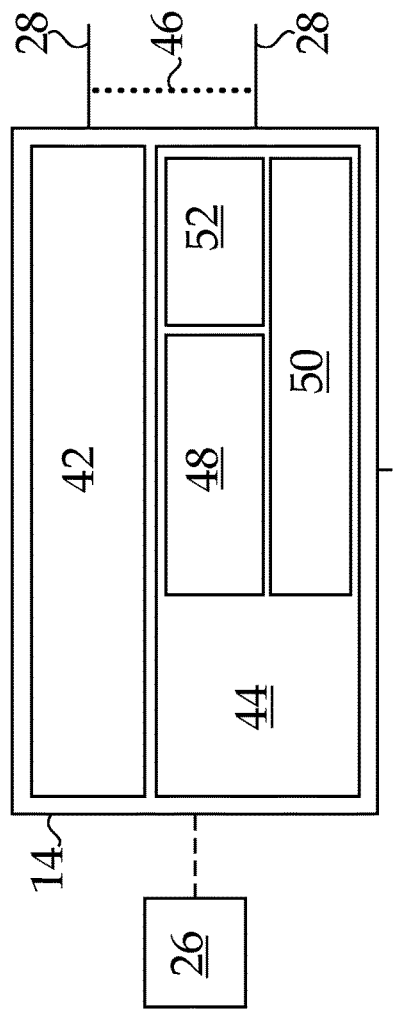
FIG. 3 schematically illustrates some aspects of a non-limiting example of a central controller for a circuit protection system in accordance with an embodiment of the present invention.

Referring to FIG. 3, central controller 14 is communicatively coupled to each of the circuit protection devices 12, and is constructed and operative to receive the electrical parameter data from the sensing module 30 of each circuit protection device 12. Central controller 14 is operative to control each of the circuit protection devices 12, e.g., based on the electrical parameter data, based on user input via input device 22, and based on smart energy management, e.g., load scheduling. In some embodiments, central controller 14 is operative to manually direct the opening and closing of selected protection switches 32 based on user input into input device 22 by sending on/off signals to the selected protection switches via communications link 28. Central controller 14 is constructed to determine whether a fault condition has occurred based on the electrical parameter data for each circuit protection device 12, and to send a signal via communications link 28 to open the protection switch 32 for each protected circuit 16 experiencing a fault condition. In some embodiments, each circuit protection device 12 may include or be coupled to a user input device (not shown) for receiving input from a user for opening or closing the switches 32.

Central controller 14 includes a preprocessing circuit 42 and a central microcontroller 44. Preprocessing circuit 42 is communicatively coupled to the sensing module 30 of each circuit protection device 12 via the communication links 28, two of which are illustrated, the balance of which are indicated by the vertical ellipsis 46. Preprocessing circuit 42 is also communicatively coupled to microcontroller 44. Preprocessing circuit 42 is operative to preprocess the electrical parameter data received from each circuit protection device, and provide the preprocessed electrical parameter data to microcontroller 44. In some embodiments, preprocessing circuit 42 includes a preprocessing circuit component for each circuit protection device 12, which performs the preprocessing for the respective preprocessing device 12. The preprocessing may include, for example, filtering the raw voltage and/or current data, and converting the electrical parameter data into a form suitable for use by microcontroller 44, e.g., analog to digital conversion. In some embodiments, preprocessing circuit 42 may also compare the electrical parameter data to thresholds to determine if a fault condition exists.

Central microcontroller 44 includes a protection module 48, a control and management module 50 and a communications module 52. In some embodiments, protection module 48 is operative to determine whether the fault condition has occurred in one or more circuit protection devices 12 based on the electrical parameter data received from the circuit protection devices 12. For example, in some embodiments, protection module 48 is operative to compare voltage and/or current measurements from sensing modules 30 with one or more thresholds to determine whether a fault condition exists. In some embodiments, protection module 48 may be constructed to determine a rate of change of voltage and/or current based on an internal microcontroller 44 clock (not shown), e.g., dV/dt and/or di/dt, and compare dV/dt and/or di/dt with one or more thresholds to determine whether a fault condition exists. Protection module 48 is operative to send one or more signals, e.g., off signals, to each circuit protection device 12 experiencing a fault condition to open protection switch 32. In one form, a separate signal is sent to each of solid state switch 34 and to galvanic isolator 36 for each circuit protection device 12 experiencing a fault condition, to open solid state switch 34 and galvanic isolator 36. For example, a gate drive signal may be sent via channel 28B to solid state switch 34, and a separate control signal may be sent via channel 28C to galvanic isolator 36. In other embodiments, a single signal may be sent to open both solid state switch 34 and galvanic isolator 36 through the same channel or through different channels. Central controller 14 may send an on signal to the previously faulted circuit protection device 12, e.g., automatically or via manual input to user input device 22, for example, once the fault condition has been cleared or removed, or in response to a user or other command or input.

Control and management module 50 is operative to perform basic and advanced control and management functions, including processing user input via input device 22 for turning circuit protection devices on or off, providing status codes or information and/or measured current/voltage data, performing load scheduling, and performing smart energy management. Smart energy management may include, for example and without limitation, turning loads on or off at selected times, controlling loads based on utility demand or other criteria, and controlling loads based on ambient conditions, e.g., ambient temperature conditions, based on the time of day or day of the week, and/or based on other parameters. Communications module 52 is operative to provide for communication between central controller 14 and system controller 26. In some embodiments, communications module 52 may be operative to manage communications between circuit protection devices 12 and central controller 14. In some embodiments, communications module 52 may employ a network communications protocol, e.g., internet protocol, CAN (control area network) protocol and/or any other suitable network protocol.

Backup controller 24 is in communication with circuit protection devices 12, e.g., via central controller 14. Backup controller 24 is constructed to receive the electrical parameter data from the sensing module 30 of each circuit protection device 12; determine whether a fault condition exists based on the circuit condition data; and send a signal to open the protection switch for each protected circuit experiencing a fault condition. In one form, backup controller 24 is similar to controller 14, e.g., has the same or similar preprocessing circuit, and microcontroller with protection module, control and management module, and communications module. In some embodiments, backup controller 24 operates in parallel to central controller 14. In other embodiments, backup controller 24 operates only upon detecting a fault in central controller 14.

System controller 26 is a higher level controller than central controller 14. In some embodiments, system controller 26 is operative to direct the operations of a plurality of central controllers 14. In some embodiments, system controller 26 may be a utility controller, or be operative to receive commands from a utility control input, e.g., via the internet, and to turn selected circuit protection devices 12 on or off or provide status information and/or measured current/voltage data and/or other data in response to the commands. In some embodiments, system controller 26 may include an input device such as a keypad, keyboard, touch screen or other input device operative to receive user input to turn selected circuit protection devices 12 on or off, or to obtain status codes for selected circuit protection devices 12. In some embodiments, system controller 26 is constructed to process user input via an input device (not shown) for turning circuit protection devices on or off, providing status codes or information and/or measured current/voltage data, performing load scheduling, and performing smart energy management, e.g., for one or more central controllers, each having a plurality of circuit protection devices associated therewith. Smart energy management may include, for example and without limitation, turning loads on or off at selected times, controlling loads based on utility demand or other criteria, and controlling loads based on ambient conditions, e.g., ambient temperature conditions, based on the time of day or day of the week, and based on other parameters.

Figure 4:
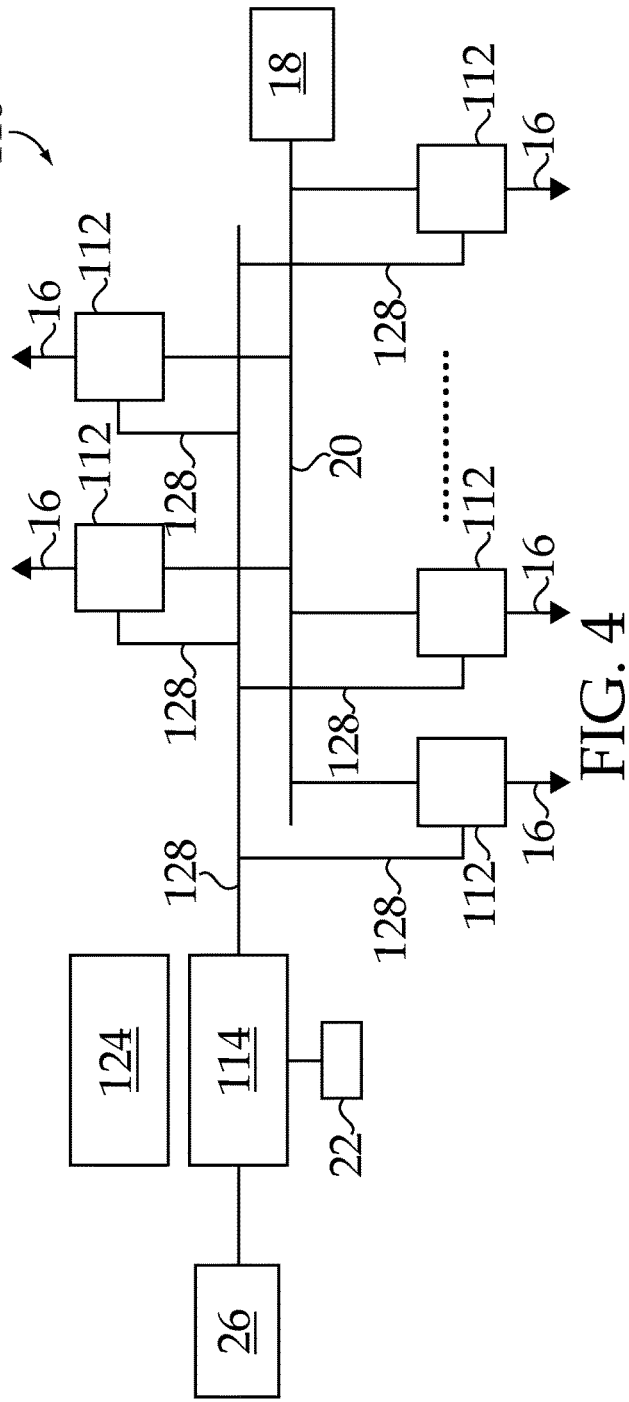
FIG. 4 schematically illustrates some aspects of a non-limiting example of a circuit protection system in accordance with an embodiment of the present invention.

Referring to FIG. 4, some aspects of a non-limiting example of a circuit protection system 110 in accordance with an embodiment of the present invention are schematically illustrated. Circuit protection system 110 includes a plurality of circuit protection devices 112 communicatively coupled to a central controller 114 and electrically disposed in a plurality of protected circuits 16 coupled to a power source 18, e.g., to a load center 20. Some embodiments include input device 22 coupled to or included as part of central controller 114. Some embodiments may also include a backup central controller 124, e.g., coupled to central controller 114 and/or circuit protection devices 112. In some embodiments, circuit protection system 110 may also include a system controller 26 coupled to central controller 114, e.g., as described above with respect to the embodiment of FIGS. 1-3. The number of circuit protection devices 112 may vary with the needs of the application. In one form, circuit protection system 110 is a circuit breaker system. In other embodiments, circuit protection system 110 may take other forms.

Each circuit protection device 112 is coupled to power source 18, e.g., load center 20. Each circuit protection device 112 is communicatively coupled to central controller 114 via a bidirectional digital communication link 128, such as a wired or wireless connection operative to transmit signals from each circuit protection device 112 to central controller 114 and to transmit signals from central controller 114 to each circuit protection device 112.

Circuit protection devices 112 are operative to connect and disconnect protected circuits 16 from power source 18 in response to a signal from central controller 114. Circuit protection devices 112 are constructed to protect protected circuits 16 from fault conditions, such as over voltage conditions or over current conditions, by disconnecting any protected circuit 16 that experiences a fault condition in response to one or more signals sent by central controller 114. Circuit protection devices 112 may be collocated, e.g., disposed together within a circuit breaker box with central controller 114, or may be disposed at locations remote from each other and/or from central controller 114, e.g., disposed at or as part of particular electrical devices, machines, lighting centers, sub circuits, remove circuit breaker cabinets, etc.

Figure 5:
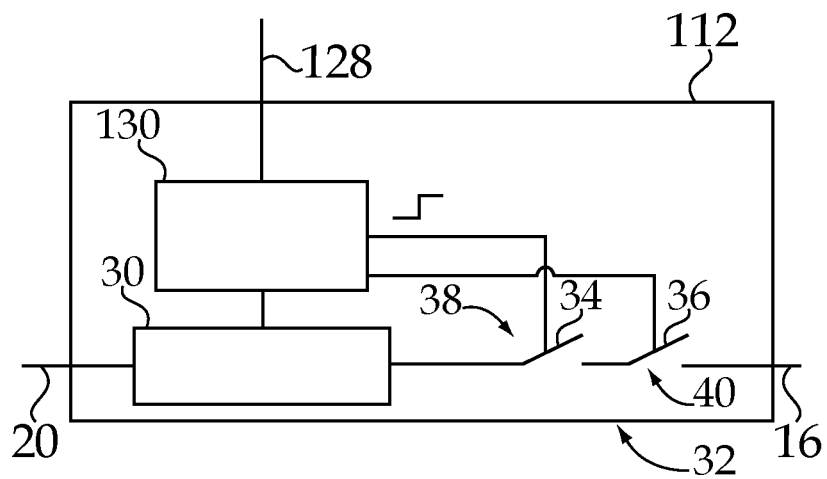
FIG. 5 schematically illustrates some aspects of a non-limiting example of a circuit protection device for a circuit protection system in accordance with an embodiment of the present invention.

Referring to FIG. 5, each circuit protection device 112 includes a sensing module 30, a local microcontroller with integrated communication unit 130, and a protection switch 32. Protection switch 32 is operative to connect and disconnect the corresponding protected circuit 16 from power source 18 at the direction of central controller 114. In one form, protection switch 32 includes a solid state switch 34 and a galvanic isolator 36 coupled in series between load center 20 and circuit 16, e.g., as described above with respect to the embodiment of FIGS. 1-3.

Sensing module 30 is operative to sense electrical parameter data pertaining to the protected circuit 16 associated with the particular circuit protection device 112, e.g., as described above with respect to the embodiment of FIGS. 1-3. Sensing module 30 is communicatively coupled to local microcontroller unit 130. Local microcontroller unit 130 is operative to perform simple data processing, e.g., to process electrical parameter data measured by sensing module 30 into digital data, e.g., via an analog-to-digital converter. In addition, microcontroller unit 130 is operative to transmit the electrical parameter data to central controller 114 via communications link 128. In some embodiments, local microcontroller unit 130 may be constructed to employ a network protocol may be employed, e.g., a CAN protocol to send the electrical parameter data to central controller 114. In some embodiments, microcontroller unit 128 may be constructed to perform preprocessing of the electrical parameter data, e.g., filtering, in addition to analog-to-digital conversion. Gate 38 of solid state switch 34 and control terminal 40 of galvanic isolator 36 are communicatively coupled to local microcontroller unit 130. Microcontroller unit 130 is operative to transmit signals to open and close solid state switch 34 and galvanic isolator 36 in response to signals received from central controller 114.

Figure 6:
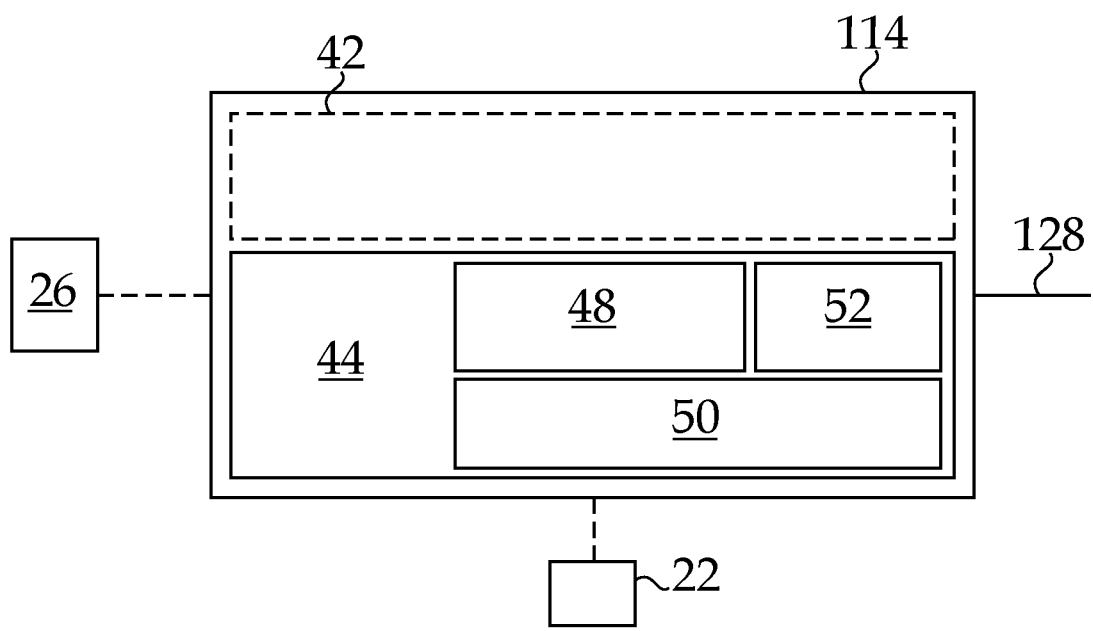
FIG. 6 schematically illustrates some aspects of a non-limiting example of a central controller for a circuit protection system in accordance with an embodiment of the present invention.

Referring to FIG. 6, central controller 114 is communicatively coupled to each of the circuit protection devices 112 via communications link 128, and is constructed and operative to receive the electrical parameter data from the microcontroller unit 130 of each circuit protection device 112. Central controller 114 is operative to control each of the circuit protection devices 112, e.g., based on the electrical parameter data, based on user input via input device 22, and based on smart energy management, e.g., load scheduling. In some embodiments, central controller 114 is operative to manually direct the opening and closing of selected protection switches 32 based on user input into input device 22 by sending on/off signals to the selected protection switches. In some embodiments, each circuit protection device 112 may include or be coupled to a user input device (not shown) for receiving input from a user for opening or closing the switches 32 (solid state switch 34 and galvanic isolator 36). Central controller 114 is constructed to determine whether a fault condition has occurred based on the electrical parameter data, for each circuit protection device 112, and to send a signal to local microcontroller 130 via communications link 128 to open the protection switch 32 for each protected circuit 16 experiencing a fault condition. Central controller includes a central microcontroller 44. In some embodiments, central controller 114 may also include a preprocessing circuit 42, e.g., as described above with respect to the embodiment of FIGS. 1-3. Preprocessing circuit 42 may be communicatively coupled to central microcontroller 44, and communicatively coupled to the microcontroller 130 of each circuit protection device 112 via communication link 128.

Central microcontroller 44 includes a protection module 48, a control and management module 50 and a communications module 52, e.g., as described above with respect to the embodiment of FIGS. 1-3. In some embodiments, protection module 48 is operative to determine whether the fault condition has occurred in one or more circuit protection devices 112 based on the electrical parameter data received from the circuit protection devices 112. For example, in some embodiments, protection module 48 is operative to compare voltage and/or current measurements from sensing modules 30 with one or more thresholds to determine whether a fault condition exists. In some embodiments, protection module 48 may be constructed to determine a rate of change of voltage and/or current e.g., based on an internal microcontroller 44 clock (not shown), e.g., dV/dt and/or di/dt, and compare dV/dt and/or di/dt with one or more thresholds to determine whether a fault condition exists. Protection module 48 is operative to send one or more signals, e.g., off signals, to each circuit protection device 112 experiencing a fault condition to open protection switch 32. Central controller 114 may send an on signal to the previously faulted circuit protection device 112, e.g., once the fault condition has been cleared, e.g., via manual input to user input device 22. Communications module 52 is operative to provide for communication between central controller 114 and system controller 26, and communications between circuit protection devices 112 and central controller 114, e.g., using the CAN protocol.

In some embodiments, local microcontroller 130 may be constructed to determine whether a fault condition exists, e.g., based on dV/dt and/or di/dt, and if so, to send a signal(s) operative to open solid state switch 34 and galvanic isolator 36 based on the detection of the fault condition. Local microcontroller may also be constructed to close solid state switch 34 and galvanic isolator 36 upon the removal of the fault condition. Such local protection may be employed in embodiments wherein particularly fast protection is desired. For example, in some power systems, the fault current may increase at a very high rate. A circuit breaker experiences high fault current until it opens. In this scenario, if the communication delay of the tripping signal sent by central controller 114 to the local circuit protection device 112 exceeds some limit, solid state switch 34 and galvanic isolator 36 may be damaged because the fault current may exceed the peak current or the thermal limit of one or both switches before the open signal is received. Accordingly, in some embodiments, local microcontroller 130 may be constructed to determine whether a fault condition exists, e.g., based on dV/dt and/or di/dt, and to send signal(s) to open solid state switch 34 and galvanic isolator 36 in a shorter period of time so as to prevent the fault current from exceeding the peak current or thermal limit of each switch. Thus, in such embodiments, the signal sent to open solid state switch 34 and/or galvanic isolator 36 may be sent by central controller 114 (central microcontroller 44) under some fault conditions, and may also or alternatively be sent sooner by local microcontroller 130 in other fault circumstances, e.g., based on the occurrence of higher values of dV/dt and/or di/dt during fault conditions.

Backup controller 124 is in communication with circuit protection devices 112, e.g., via central controller 114 and communication link 128. Backup controller 124 is constructed to receive the electrical parameter data from the sensing module 30 of each circuit protection device 112; determine whether a fault condition exists based on the circuit condition data; and send a signal to open the protection switch for each protected circuit experiencing a fault condition. In one form, backup controller 124 is the same as or similar to controller 114, e.g., has the same or similar preprocessing circuit, and microcontroller with protection module, control and management module, and communications module. In some embodiments, backup controller 124 operates in parallel to central controller 114. In other embodiments, backup controller 124 operates only upon detecting a fault in central controller 114.

Some embodiments may include both digital and analog communication. For example, the electrical parameter data may be sent from the circuit protection devices to the central controller via an analog connection as described above, whereas encoded status signals and on/off commands may be sent from the central controller to the circuit protection devices by a digital wired or wireless connection.

Because the circuit protection control functions are performed in the central controller, i.e., via preprocessing circuit 42 (for embodiments so equipped), microcontroller 44 and protection module 48 for all of the circuit protection devices 12, 112, each individual circuit protection device 12, 112 does not include one or more of various components used to provide circuit protection. For example, in the embodiment of FIG. 1-3, each circuit protection device 12 does not include all of the electrical/electronic circuits components employed for circuit protection, e.g., for signal processing (e.g., preprocessing) and for protection functions such as fault determination and switching on/off control in response to fault determination, and hence also does not require an auxiliary power supply for supplying power to such components. Rather, the central controller includes such protection components for in common use by multiple circuit protection devices 12, 112, e.g., providing the protection functions for multiple circuit protection devices 12, 112.

Similarly, with the embodiment of FIGS. 4-6, each circuit protection device 112 does not include all of the electrical/electronic circuits components required for circuit protection, e.g., for signal processing (e.g., preprocessing)(in some embodiments), protection functions and switching control, and hence also does not require an auxiliary power supply or an auxiliary power supply sized for supplying power to such components. Accordingly, since include most or all of the electrical/electronic circuits components employed for circuit protection are disposed in the central controller, more space is available in the circuit protection devices 12, 112, e.g., within standardized circuit protection device enclosures or standardized circuit protection device enclosure sizes, for providing additional cooling features, e.g., heat sinks, cooling fins, cooling fans and the like, for cooling solid state switch 34, compared to conventional circuit protection devices that include protection function features. In some embodiments, this may increase current capacity and/or reduce cost relative to systems having all of the required circuit protection function components in each circuit protection device. In other embodiments, the reduced spatial requirements may be used to provide more compact packaging.

Embodiments of the present invention include a circuit protection system, comprising: a plurality of circuit protection devices for a plurality of protected circuits, each circuit protection device including a protection switch for connecting or disconnecting a corresponding protected circuit; and including a sensing module for sensing electrical parameter data in the corresponding protected circuit; and a central controller in communication with each of the circuit protection devices, wherein the central controller is constructed to receive the electrical parameter data from the sensing module of each circuit protection device; determine whether a fault condition has occurred based on the electrical parameter data; and send a signal to open the protection switch for each protected circuit experiencing a fault condition.

In a refinement, the protection switch includes a solid state switch having a gate, and the central controller is constructed to send a gate drive signal to the gate to open the switch upon the occurrence of a fault condition.

In another refinement, the protection switch includes a galvanic isolator switch in series with the solid state switch; and wherein the central controller is constructed to send a signal to open the galvanic isolator switch upon the occurrence of the fault condition.

In yet another refinement, the circuit protection system further comprises an analog communication link between the central controller and each circuit protection device, wherein the analog communication link is operative to transmit the electrical parameter data from each circuit protection device to the central controller and to transmit the signal to open the protection switch from the central controller to each protected circuit experiencing the fault condition.

In still another refinement, the circuit protection system further comprises a digital communication link between the central controller and each circuit protection device, wherein the digital communication link is operative to transmit the electrical parameter data from each circuit protection device to the central controller and to transmit the signal to open the protection switch from the central controller to each protected circuit experiencing the fault condition.

In yet still another refinement, the central controller includes a backup controller in communication with each of the circuit protection devices, and the backup controller is constructed to receive the electrical parameter data from the sensing module of each circuit protection device; determine whether a fault condition exists based on the circuit condition data; and send a signal to open the protection switch for each protected circuit experiencing a fault condition.

In a further refinement, at least some of the circuit protection devices are remote from the central controller.

In a yet further refinement, the circuit protection system further comprises a system controller operative to interface with the central controller, wherein the system controller is operative to turn selected circuit protection devices on or off in response to user commands and/or in response to a utility control input.

In a still further refinement, the circuit protection system further comprises a user input device coupled to the central controller, wherein the user input device is operative to receive user input for manually directing the opening and closing of the protection switches for at least some of the circuit protection devices.

Embodiments of the present invention include a circuit protection system, comprising: a plurality of circuit protection devices for a corresponding plurality of protected circuits, each circuit protection device including a protection switch for connecting or disconnecting a corresponding protected circuit; and including a sensing module for sensing electrical parameter data in the corresponding protected circuit; and a central controller in communication with the plurality of protection devices and operative to receive the electrical parameter data from each of the circuit protection devices and to control each of the circuit protection devices based on the electrical parameter data, the central controller including a central microcontroller having a protection module operative to determine, based on the sensed electrical parameter data, whether a fault condition has occurred, to send a signal to open the protection switch for each protected circuit experiencing the fault condition, and to send a signal to close the protection switch after the fault condition is removed.

In a refinement, the electrical parameter data includes voltage and/or current; and the central controller further includes a preprocessing circuit in communication with the sensing module of each circuit protection device and in communication with the central microcontroller, wherein the preprocessing circuit is constructed to preprocess the voltage and/or current and provide preprocessed electrical parameter data to the central microcontroller.

In another refinement, each circuit protection device further includes a local microcontroller and communication module, wherein the local microcontroller and communication module is in communication with the central microcontroller and operative to send the electrical parameter data to the central microcontroller and to receive the signal from the central controller and direct the protection switch to open or close in response to the signal.

In another refinement, each circuit protection device further including a local microcontroller, wherein the local microcontroller is also operative to determine, based on the sensed electrical parameter data, whether a fault condition has occurred, and to send a signal to open the protection switch if the fault condition occurs.

In yet another refinement, the central controller further includes a control and management module operative to perform smart energy management.

In still another refinement, the protection switch includes a solid state switch having a gate, wherein the signal is a gate drive signal operative to open the switch.

In yet still another refinement, the protection switch includes a galvanic isolator switch in series with the solid state switch; wherein the central controller is constructed to direct the galvanic isolator switch to open for each protected circuit experiencing the fault condition.

In a further refinement, each circuit protection device further including a local microcontroller, wherein the local microcontroller is also constructed to direct the galvanic isolator switch to open if the fault condition occurs.

In a another further refinement, the circuit protection system further comprises an analog communication link between the central controller and each circuit protection device, wherein the analog communication link is operative to transmit the electrical parameter data from each circuit protection device to the central controller and to transmit the signal to open the protection switch from the central controller to each protected circuit experiencing the fault condition.

In a yet further refinement, the circuit protection system further comprises a digital communication link between the central controller and each circuit protection device, wherein the digital communication link is operative to transmit the electrical parameter from each circuit protection device data to the central controller and to transmit the signal to open the protection switch from the central controller to each protected circuit experiencing the fault condition.

In a still further refinement, the circuit protection system further comprises a system controller operative to interface with the central controller, wherein the system controller is operative to turn selected circuit protection devices on or off in response to user commands and/or in response to a utility control input.

In a yet still further refinement, the circuit protection system further comprises a user input coupled to the circuit protection system, wherein the user input is operative to receive user input to manually direct the opening and closing of the protection switches for at least some of the circuit protection devices.

Embodiments of the present invention include a circuit protection system, comprising: a plurality of circuit protection devices for a corresponding plurality of protected circuits, each circuit protection device including a protection switch for connecting or disconnecting a corresponding protected circuit; and including a sensing module for sensing electrical parameter data in the corresponding protected circuit; and centralized means for determining the occurrence of a fault condition in one or more of the protected circuits based on the electrical parameter data and for directing the opening of the protection switch for each protected circuit experiencing a fault condition.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A circuit protection system, comprising:
a plurality of circuit protection devices for a plurality of protected circuits, each circuit protection device including a protection switch and a sensing module, the protection switch configured to connect or disconnect a corresponding protected circuit, the circuit protection device being configured to transmit electrical power through the corresponding protected circuit to an electrical machine that is particularly associated with the corresponding circuit protection device, the protection switch a solid state switch having a gate, the solid state switch being adapted to interrupt a fault current upon detection of a short-circuit fault current in the corresponding protected circuit, the sensing module connected in series with the protection switch and positioned between the protection switch and a load center, the sensing module adapted to sense electrical parameter data in the corresponding protected circuit; and
a central controller in communication with each of the circuit protection devices, wherein the central controller is electrically coupled to the sensing module of each circuit protection device and constructed to receive, via an analog electric signal, the electrical parameter data from the sensing module of each circuit protection device; determine, from the electrical parameter from the analog signal, whether a short-circuit fault current condition has occurred in the corresponding protected circuit based on the electrical parameter data; and send a digital signal to at least one protection switch of the plurality of circuit protection devices that, based on the determination of the short-circuit fault current condition occurring, opens the protection switch for each protected circuit experiencing a short-circuit fault current condition.

2. The circuit protection system of claim 1, wherein the central controller is constructed to send a gate drive signal to the gate to open the switch upon the occurrence of a short-circuit fault current condition.

3. The circuit protection system of claim 2, wherein the protection switch includes a galvanic isolator switch in series with the solid state switch; and wherein the central controller is constructed to send a signal to open the galvanic isolator switch upon the occurrence of the short-circuit fault current condition.

4. The circuit protection system of claim 1, further comprising an analog communication link between the central controller and each circuit protection device, wherein the analog communication link is operative to transmit the electrical parameter data from each circuit protection device to the central controller, and wherein the protection switch includes a galvanic isolator switch in series with the solid state switch, wherein the central controller is constructed to send a signal that opens both the galvanic isolator switch and the protection switch upon the occurrence of the short-circuit fault current condition.

5. The circuit protection system of claim 1, further comprising a digital communication link between the central controller and the protection switch of each circuit protection device, wherein the digital communication link is operative to transmit the signal to open the protection switch from the central controller to each protected circuit experiencing the short-circuit fault current condition.

6. The circuit protection system of claim 1, wherein the central controller includes a backup controller in communication with each of the circuit protection devices, and wherein the backup controller is constructed to receive the electrical parameter data from the sensing module of each circuit protection device; determine whether a short-circuit fault current condition exists based on the circuit condition data; and send a signal to open the protection switch for each protected circuit experiencing a short-circuit fault current condition.

7. The circuit protection system of claim 1, wherein at least some of the circuit protection devices are remote from the central controller.

8. The circuit protection system of claim 1, further comprising a system controller operative to interface with the central controller, wherein the system controller is operative to turn selected circuit protection devices on or off in response to user commands and/or in response to a utility control input.

9. The circuit protection system of claim 1, further comprising a user input device coupled to the central controller, wherein the user input device is operative to receive user input for manually directing the opening and closing of the protection switches for at least some of the circuit protection devices, and wherein the central controller is further configured to operate protection switches based on load scheduling.

10. A circuit protection system, comprising:
a plurality of circuit protection devices for a corresponding plurality of protected circuits, each circuit protection device including a protection switch for connecting or disconnecting a corresponding protected circuit, the circuit protection device being configured to transmit electrical power through the corresponding protected circuit to an electrical machine that is particularly associated with the corresponding circuit protection device, the protection switch including a solid state switch having a gate, the solid state switch being adapted to interrupt a fault current upon detection of a short-circuit fault current in the corresponding protected circuit; and including a sensing module connected in series with the protection switch and positioned between the protection switch and a load center, the sensing module adapted to sense electrical parameter data in the corresponding protected circuit;
a central controller;
an analog link electrically coupling the central controller to the sensing module of each circuit protection device, the central controller including a central microcontroller having a protection module operative to determine, based on the sensed electrical parameter data communicated in an electric signal from the sensing module of at least one of the plurality of circuit protective devices to the central controller, whether a short-circuit fault current condition has occurred in the corresponding protected circuit; and
a digital link between the central controller and the protection switch of each circuit protection device to send a digital signal from the central controller to the protection switch for each protected circuit experiencing the short-circuit fault current condition that opens the protection switch, and to send a signal to close the protection switch after the short-circuit fault current condition is removed.

11. The circuit protection system of claim 10, wherein the electrical parameter data includes voltage and/or current; and wherein the central controller further includes a preprocessing circuit in communication with the sensing module of each circuit protection device via the analog link, and in communication with the central microcontroller, wherein the preprocessing circuit is constructed to preprocess the voltage and/or current provided in an analog electrical signal via the analog link from the sensing module of each circuit protection device and provide preprocessed electrical parameter data to the central microcontroller.

12. The circuit protection system of claim 10, the central controller further including a control and management module operative to perform smart energy management.

13. The circuit protection system of claim 10, wherein the digital signal is a gate drive signal operative to open the switch.

14. The circuit protection system of claim 13, wherein the protection switch includes a galvanic isolator switch in series with the solid state switch; and wherein the central controller is constructed to direct the galvanic isolator switch to open for each protected circuit experiencing the short-circuit fault current condition.

15. The circuit protection system of claim 10, wherein the central controller further includes a preprocessing circuit in communication with the sensing module of each circuit protection device via the analog link, the preprocessing circuit configured to convert the electrical parameter data from an analog electrical signal to a digital signal.

16. The circuit protection system of claim 15, wherein the preprocessing circuit is configured to compare the electrical parameter data to a threshold to determine if a short-circuit fault current condition exists.

17. The circuit protection system of claim 10, further comprising a system controller operative to interface with the central controller, wherein the system controller is operative to turn selected circuit protection devices on or off in response to user commands and/or in response to a utility control input.

18. The circuit protection system of claim 10, further comprising a user input coupled to the circuit protection system, wherein the user input is operative to receive an input from a user to manually direct the opening and closing of the protection switches for at least some of the circuit protection devices.

19. A circuit protection system, comprising:
a plurality of circuit protection devices for a corresponding plurality of protected circuits, each circuit protection device including a protection switch for connecting or disconnecting a corresponding protected circuit, the circuit protection device being configured to transmit electrical power through the corresponding protected circuit to an electrical machine that is particularly associated with the corresponding circuit protection device, the protection switch including a solid state switch having a gate, the solid state switch being adapted to interrupt a fault current upon detection of a short-circuit fault current in the corresponding protected circuit; and including a sensing module connected in series with the protection switch and positioned between the protection switch and a load center, the sensing module adapted to sense electrical parameter data in the corresponding protected circuit; and
centralized means for determining the occurrence of a short-circuit fault current condition in one or more of the protected circuits based on the electrical parameter data in an analog electric signal from the plurality of circuit protection devices, and for opening, upon receipt of a digital signal from the centralized means to the protection switches, the protection switch for each protected circuit experiencing a short-circuit fault current condition.

* * * * *